United States Patent
Kanjilal et al.

(10) Patent No.: US 10,304,038 B2
(45) Date of Patent: *May 28, 2019

(54) INTEGRATING RICH MEDIA INTO A WEB-BASED DISPLAY INTERFACE

(71) Applicant: YAHOO HOLDINGS, INC., Sunnyvale, CA (US)

(72) Inventors: Arup Kanjilal, San Jose, CA (US); Chinhao David Lee, Mountain View, CA (US)

(73) Assignee: OATH INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/726,144

(22) Filed: Oct. 5, 2017

(65) Prior Publication Data
US 2018/0032958 A1    Feb. 1, 2018

Related U.S. Application Data

(63) Continuation of application No. 12/211,770, filed on Sep. 16, 2008, now Pat. No. 9,785,916.
(Continued)

(51) Int. Cl.
*G06Q 10/10*    (2012.01)
*G06F 17/21*    (2006.01)
(Continued)

(52) U.S. Cl.
CPC ......... *G06Q 10/107* (2013.01); *G06Q 10/109* (2013.01); *C08K 9/06* (2013.01);
(Continued)

(58) Field of Classification Search
CPC .... G06F 17/2247; G06F 17/24; G06F 17/277; G06F 17/2264; G06F 3/0481;
(Continued)

(56) References Cited

U.S. PATENT DOCUMENTS 6,018,343 A    1/2000  Wang
6,380,959 B1   4/2002  Wang et al.
(Continued)

OTHER PUBLICATIONS

U.S. Appl. No. 12/211,770, filed Sep. 16, 2008, Office Action dated Jan. 28, 2014.
(Continued)

*Primary Examiner* — Quoc A Tran
(74) *Attorney, Agent, or Firm* — Pillsbury Winthrop Shaw Pittman LLP

(57) ABSTRACT

Techniques are provided for integrating rich media into a scalable, multi-user, web-based calendar system having multiple interconnected web-based interfaces. Rich media refers to digital media that exhibit either, or a combination, of dynamic or interactive properties, including video content, audio content, graphical content, hyperlinks, or browser-based applications to such content, that are associated with a particular calendar event. Rich media events are created and stored in a central repository, and are accessible for adding to users' own calendar events. Rich media calendar events include display templates that define display characteristics for the rich media calendar event. Display templates also provide rich media applications for rendering and displaying the rich media content in the event. Delivery schedules are employed to automatically control the display of rich media calendar events.

21 Claims, 6 Drawing Sheets

Related U.S. Application Data

(60) Provisional application No. 60/979,777, filed on Oct. 12, 2007.

(51) Int. Cl.

| | | |
|---|---|---|
| *G06F 17/30* | (2006.01) | |
| *G06F 17/27* | (2006.01) | |
| *G06F 17/22* | (2006.01) | |
| *G06F 17/24* | (2006.01) | |
| *G06F 3/0482* | (2013.01) | |
| *G06Q 30/02* | (2012.01) | |
| *C08K 9/06* | (2006.01) | |
| *G06F 16/951* | (2019.01) | |
| *H04L 29/06* | (2006.01) | |
| *G06Q 10/06* | (2012.01) | |

(52) U.S. Cl.
CPC .......... *G06F 3/0482* (2013.01); *G06F 16/951* (2019.01); *G06F 17/211* (2013.01); *G06F 17/2247* (2013.01); *G06F 17/2264* (2013.01); *G06F 17/24* (2013.01); *G06F 17/277* (2013.01); *G06F 17/30864* (2013.01); *G06Q 10/06* (2013.01); *G06Q 10/1095* (2013.01); *G06Q 30/02* (2013.01); *H04L 67/42* (2013.01)

(58) Field of Classification Search
CPC .......... G06F 17/3089; G06F 17/30864; G06F 3/0482; G06Q 10/07; G06Q 10/09; G06Q 10/06; G06Q 10/109; G06Q 50/01; G06G 17/30864; H06F 3/038; H04L 67/42
See application file for complete search history.

(56) References Cited

U.S. PATENT DOCUMENTS

| | | |
|---|---|---|
| 2002/0038316 A1 | 3/2002 | Onyon et al. |
| 2002/0184321 A1 | 12/2002 | Fishman et al. |
| 2002/0194194 A1 | 12/2002 | Fenton et al. |
| 2002/0194246 A1 | 12/2002 | Moskowitz |
| 2005/0278641 A1 | 12/2005 | Mansour et al. |
| 2007/0168892 A1 | 7/2007 | Brush et al. |
| 2008/0040188 A1 | 2/2008 | Klausmeier |
| 2008/0120396 A1 | 5/2008 | Jayaram et al. |
| 2008/0294663 A1 | 11/2008 | Heinley |
| 2008/0294994 A1 | 11/2008 | Kruger et al. |
| 2008/0319818 A1* | 12/2008 | Gurdin .................. G06F 9/4443 705/7.24 |
| 2009/0043627 A1 | 2/2009 | Vaidya |
| 2009/0276531 A1 | 11/2009 | Myka et al. |
| 2013/0067342 A1* | 3/2013 | Groves ................ G06Q 10/109 715/739 |
| 2015/0169528 A1* | 6/2015 | Sjogreen ............ G06Q 10/1095 715/227 |
| 2017/0221094 A1* | 8/2017 | Price .................... G06Q 10/109 |

OTHER PUBLICATIONS

U.S. Appl. No. 12/211,770, filed Sep. 16, 2008, Office Action dated Apr. 7, 2015.
U.S. Appl. No. 12/211,770, filed Sep. 16, 2008, Final Office Action dated Oct. 7, 2015.
U.S. Appl. No. 12/211,770, filed Sep. 16, 2008, Final Office Action dated Jul. 30, 2014.
U.S. Appl. No. 12/211,770, filed Sep. 16, 2008, Advisory Action dated Nov. 25, 2015.
Kanjilal, U.S. Appl. No. 12/211,770, filed Sep. 16, 2008, Office Action dated Oct. 24, 2011.
Kanjilal, U.S. Appl. No. 12/211,770, filed Sep. 16, 2008, Notice of Allowance dated Jun. 5, 2017.
Kanjilal, U.S. Appl. No. 12/211,770, filed Sep. 16, 2008, Final Office Action dated Jan. 20, 2017.
U.S. Appl. No. 12/211,770, filed Sep. 16, 2008, Office Action dated Jul. 1, 2016.

* cited by examiner

100 RICH MEDIA CALENDAR EVENT event feed: LOST Season 4
event description: "Episode 7: I Do"
time:10:00p
date: "February 7, 2007"
detail: "Jack makes a decision about ..."
-RICH MEDIA EXTENSION-
rich media content:: "video1, photogalleryapp1, photogallery1"
display template: "distmp1"
active: January 26, 2007 - May 20, 2007

FIG. 1

300 RICH MEDIA CALENDAR EVENT event feed: LOST Season 4
    event description: "Episode 7: I Do"
    time:10:00p
    date: "February 7, 2007"
    detail: "Jack makes a decision about ..."
    -RICH MEDIA EXTENSION-
    rich media content: "video1, video 2, video3, photogalleryapp1, photogallery1"
    display template: "distmp1"
    delivery schedule: "video1:01/26/07-02/26/07;video2:02/27/07-03/26/07; video3:03/27/07-05/20/07"
    active: January 26, 2007 - May 20, 2007

FIG. 3

INTEGRATING RICH MEDIA INTO A WEB-BASED DISPLAY INTERFACE

CLAIM OF PRIORITY

This application is a Continuation of prior U.S. patent application Ser. No. 12/211,770 entitled "Integrating Rich Media Into A Web-Based Calendar", filed Sep. 16, 2008, which claims the benefit of U.S. Provisional Application No. 60/979,777 entitled "Method And Apparatus For Providing Rich Media In Web-Based Data Interfaces", filed Oct. 12, 2007, the entire contents of which is hereby incorporated by reference as if fully set forth herein.

FIELD OF THE INVENTION

The present invention relates to web-based distribution of rich media, and in particular, to integrating rich media into a scalable, multi-user, web-based calendar system having multiple interconnected web-based interfaces.

BACKGROUND

Rich media, as used herein, refers to digital media that exhibits either, or a combination of, dynamic or interactive properties. Digital media that exhibits dynamic properties is referred to herein as "dynamic content". For example, videos, music and animations exhibit dynamic properties. Therefore, "dynamic content" includes, but is not limited to, video content, audio content, and dynamic graphical content.

Digital media that exhibits interactive properties is referred to herein as "interactive graphical content." For example, a dialog box with controls for receiving user input exhibits interactive properties. Therefore, "interactive graphical content" includes, but is not limited to, dialog boxes and interactive applications that are executed by a web browser.

Rich media data, when processed by a rich media application, is presented as rich media to a user. Rich media display applications, such as media players, cause rich media content to be presented through one of many possible rich media display interfaces. The rich media display interfaces used by the rich media display application may include, for example, independent floating window displays, or embedded displays that are shown within another interface. Rich media display applications include standalone applications and embedded web applications. Typically, web browsers execute programs that cause embedded web applications to be retrieved, loaded, and executed.

Popular content providers of rich media content include promotional websites, such as television network websites or movie studio websites that show video clips or audio content of promotional material. Typically, the rich media content is shown through a web-based rich media application that is embedded into one of the content provider's web pages. For example, a network television web site may expose users to an animation that promotes a particular TV show by embedding, within one of its web pages, (a) code for playing animations, and (b) rich media data for the animation that promotes the TV show. A user is led to a particular web page with rich media content by, for example, following a hyperlink from a different document that refers to the particular web page.

Rich media content that is provided by such promotional websites is often time-sensitive because the rich media content relates to a particular promotional schedule of a particular production. For example, a television network broadcasts episodes of a television show according to a television broadcast schedule. Because the television network website has different rich media content for different episodes, it is desirable for different rich media content to be made available by the television network at different times and dates, depending on the television broadcast schedule. Because of the frequent updating of such types of rich media content, it is desirable for a television network to have a user access a television show website repeatedly to view updated rich media content.

According to one approach for leading a user to view updated rich media content, a television network may send an email reminder to a list of subscribers who have subscribed to such reminders for the particular television show. The email reminder includes a hyperlink that refers to the content provider's web page that has the rich media content. By following the hyperlink, the user is led to view the updated rich media content.

In this approach, the user must click on the referencing hyperlink to access the rich media content from the content provider. Unless the user follows the referencing hyperlink, the user would not view the rich media content.

In a different approach, a user creates a recurring calendar event in the user's calendar that reminds the user to access the television show website to check for any new rich media content. Like the email reminder, the recurring calendar event that is created by the user may include a particular hyperlink that leads the user to the web page to view the content.

This approach shares the deficiency of the email-reminder approach because both approaches require the user to click on the referencing hyperlink to access the rich media content from the content provider. Furthermore, the recurring calendar event that is created by the user merely approximates the television broadcast schedule according to the user's estimations regarding when a content provider's website may be updated with new rich media content. If a user's estimations are incorrect, the user will either view previously-viewed rich media content, or miss an update of rich media content.

Approaches that avoid the deficiencies in the approaches herein discussed are desirable.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is a block diagram that illustrates one high-level example of a rich media calendar event, according to one embodiment of the invention.

FIG. 3 is a flow diagram that illustrates one high-level example of a rich media calendar event having a delivery schedule, according to one embodiment of the invention.

DETAILED DESCRIPTION

Figure 2:
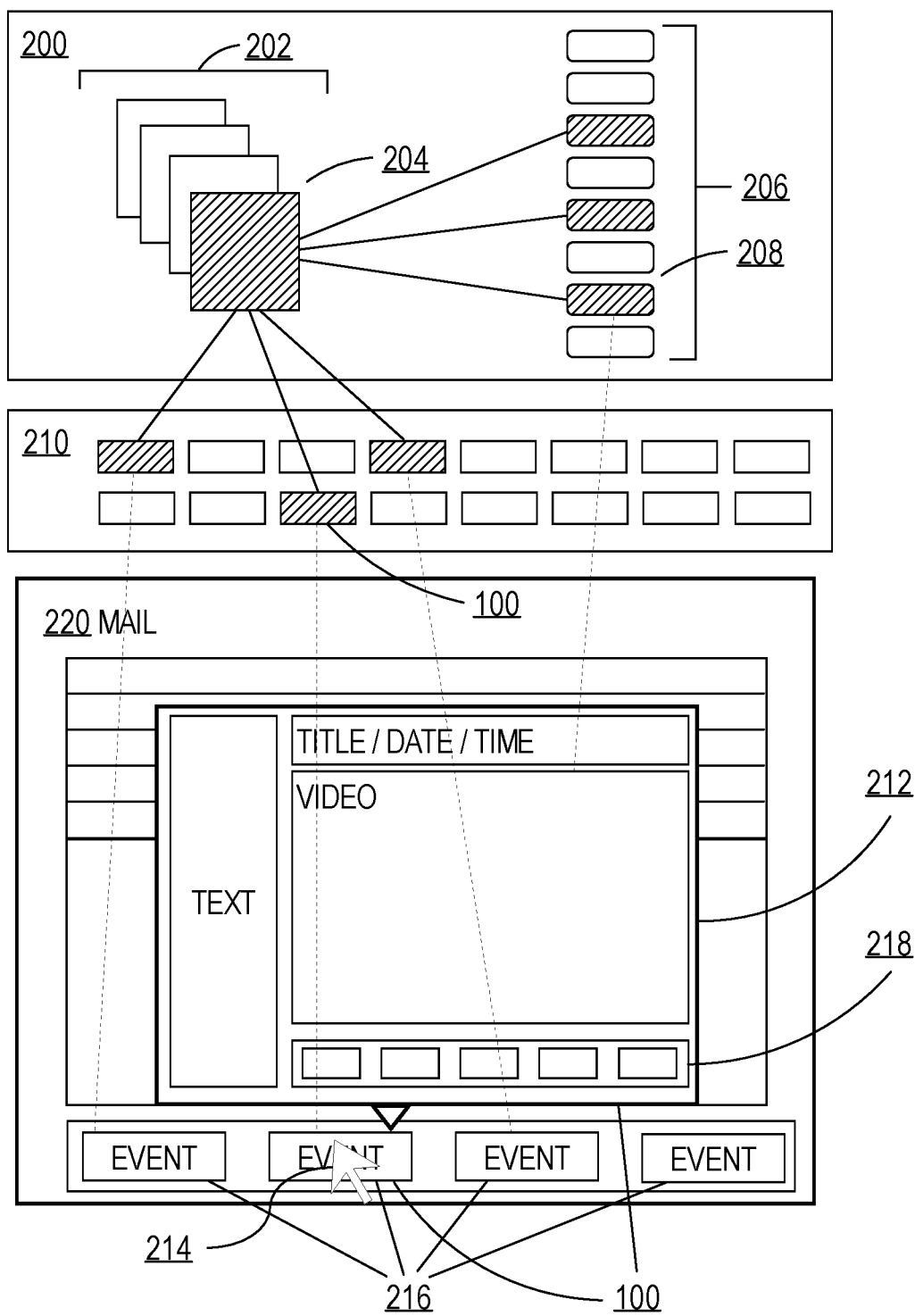
FIG. 2 is a block diagram that illustrates the associations between rich media objects, display templates, events, and an interface through which the rich media and the events are rendered and displayed, according to one embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques are provided to create a central rich media platform for integrating rich media into a scalable, multi-user, web-based calendar system having multiple interconnected web-based interfaces. The rich media platform may be provided with rich media content from various sources, and a means to distribute the rich media through a web-based calendar system. The following description sets forth features found in one or more embodiments of the invention. However, the present invention is not limited to only the embodiments discussed herein.

Sources of rich media content for the rich media platform include, but are not limited to, commercial content providers, such as television networks and movie studios, as well as individual content providers, such as users of a web-based calendar system through which the rich media content is distributed.

Users of the calendar system generate data records for the users' calendars, herein referred to as calendar events. The calendar events comprise calendar event data. Calendar event data includes at least one or more of a date, a time, and a description. Calendar event data are displayed in one or more different types of calendar event interfaces. Examples of different calendar event interfaces are described in further detail below.

The appearance of a calendar event is defined by a display template that specifies display characteristics for each of the calendar event data included in the calendar event. Display characteristics include how each of the data items in the calendar event appears when the calendar event is displayed within one of the types of calendar event interfaces. The display templates also include one or more rich media display applications, such as a video player, that parses the rich media data and renders the rich media in a display.

A rich media calendar event is a calendar event that includes rich media data that is embedded within or otherwise associated with the event. Rich media calendar events include events that are created by a user for adding to the user's own calendar, and also by third parties, such as a commercial content provider. Such events that are created by a third party are made available to users for adding to the users' calendars. As used herein, the term "third party" also refers to individual users who create events for other users.

Rich media calendar events can be grouped together as a rich media event feed. Adding a rich media event feed to users' calendars causes all calendar events that are grouped into the feed to be added or removed from the users' calendars according to the rich media event feed's delivery schedule.

Rich media content that is included within any particular rich media calendar event can be added, removed, or replaced. Even after rich media calendar events are added to users' calendars, either individually, or within a feed, the third party author of the events can modify any of the content of any of the events that comprise the feed. Users' calendars will automatically reflect the modifications made to the content of any of the events that comprise the feed.

Rich media content in rich media calendar events can also be updated automatically according to a rich media content delivery schedule. When an event that includes a rich media content delivery schedule is created, the author creates an association between the event and all the variations of rich media content that are scheduled to be displayed. The association may be created, for example, by embedding the rich media content within the event. When the rich media calendar event is added to users' calendars, all the rich media content is included within the event. When the rich media calendar event is viewed in an event interface, only the rich media content that is activated by the schedule is displayed. Using this technique, an author of a rich media event can program the modifications directly into the rich media calendar event, thereby obviating the need to manually modify the event each time a modification is desired.

Multi-User Calendar System Having Multiple Interconnected Web-Based Interfaces

According to one embodiment of the invention, a web-based multi-user calendar system is provided. Rich media is integrated into the calendar system. The calendar system may be interconnected with various different web-based display interfaces.

In one embodiment, each user of the calendar system has a separate set of data. Web-based display interfaces are accessed by a user through a web page using a web browser. Different portions of the user's own set of data are loaded onto different web-based display interfaces, depending on the design of a particular display interface. For example, a portion comprising a user's calendar event data is loaded and displayed when the user visits a web-based calendar site, while another portion comprising the user's email data is loaded and displayed when the user visits a web-based email site.

Alternatively, if various different web-based display interfaces (e.g. a web-based calendar interface and a web-based email interface) are interconnected with the multi-user calendar system, then the same data item may be loaded onto different display interfaces. For example, both the web-based calendar interface and the web-based email interface may display the same rich media calendar events. However, the manner by which the interfaces display the events will typically vary from interface to interface. For example, a calendar interface may display a video event as a video playing within a particular day of a calendar display. On the other hand, the same video event may be displayed in an email interface as an animated thumbnail.

Interfaces are said to be "interconnected" when the interfaces are able to access and load a same data item from the user's set of data. For example, if a particular calendar event can be both loaded onto a monthly view of a calendar display interface, and onto an email display interface, then the calendar display interface and the email display interface are interconnected. Such interconnection between interfaces allows a user to view calendar events from the email interface without needing to load the calendar interface.

Loading a Subset of Event Data

Depending on the interface, only a particular portion of the calendar event is loaded onto a particular interface. For example, in one embodiment, an email interface loads the user's calendar events into a simple list of calendar events alongside a display for electronic mail. The simple list of calendar events includes only the event's date, time, and a short excerpt from the event's description. In one embodiment, the simple list is interactive. For example, when a user clicks on an item in the list, the email interface opens a window in which more portions of data from the calendar event data record are displayed.

Group Calendar Interface

According to one embodiment, a group interface is used to connect multiple users as a group. In this embodiment, the group is considered to be a user. Like a user, the group maintains its own common set of user data. Each of the multiple users who belong to the group maintains the common set of data. Each user of the group can also add to the common set of data. For example, a user adds to the group's set of electronic messages by sending a message to the group's email address. In another example, a user creates a calendar event and adds the calendar event to the group's calendar. A group's common set of data can be loaded onto one of the user's individual interfaces. For example, a list of group calendar events is loaded onto a portion of user's individual email interface.

Rich Media Calendar Events

In one embodiment of the invention, a rich media calendar event is a data record that includes at least one of a date, a time, a description, rich media content, and other event data, such as a delivery schedule for the event, a delivery schedule for particular rich media content, and a reference to display templates to use for the particular event. Alternatively, instead of maintaining a delivery schedule in the rich media calendar event, event delivery schedules and content delivery schedules are maintained separately from the rich media calendar event. Furthermore, common event delivery schedules and content delivery schedules are shared among one or more related calendar events, for example, calendar events that belong to a common calendar event feed.

In one embodiment, rich media data, or a rich media object, is included in the event. Instead of including rich media data within the rich media calendar event data record, a reference, such as a uniform resource locator (URL) that refers to rich media data that is stored separately from data record, may be included.

An example of a rich media calendar event, according to one embodiment of the invention, is shown in FIG. 1. The calendar event data in rich media calendar event 100 includes: event feed data; event description data; time; date; detail; and the rich media portion, which is labeled in FIG. 1 as "rich media extension." The rich media extension portion includes actual rich media content data, or references to rich media content data that is stored in a repository external to rich media calendar event 100. In one embodiment of the invention, the repository which stores rich media content data is connected to the multi-user calendar system over a computer network.

Referring to FIG. 1, the rich media content associated with rich media calendar event 100 includes: a video; an embedded photo gallery application; a particular photo gallery that provides data to the photo gallery application; a display template that specifies the physical layout and appearance of the event data; and a range of dates for which the rich media extension of the calendar event data is active.

The foregoing is merely one example of a rich media calendar event in one embodiment of the invention. The particular features described therein in no way limit the types of data or rich media that can be included in other embodiments of the invention.

Inactive Rich Media Events

When a rich media calendar event is not active (because it is not within its range of active dates as determined by the rich media event's delivery schedule), the event is shown merely as a standard text-based calendar event. According to one embodiment, while not active, the rich media extension portion of the data that will not load into any interface. In one embodiment of the invention, the rich media calendar event expires by default 90 days after the date of the event.

Adding and Removing Rich Media Calendar Events

Rich media calendar events, such as the example featured in FIG. 1, are created through tools provided through a rich media calendar application programming interface (API). According to one embodiment of the invention, rich media calendar events that are created by third parties are stored in a central repository that is associated with the multi-user calendar system. Through the API, an event creator can group together rich media calendar events into an event feed. Grouping rich media calendar events into an event feed allows the group of events to be added collectively to a user's individual calendar.

According to one embodiment the invention, a user adds events, or event feeds, to the user's individual calendar through an interactive advertisement interface. In the embodiment, an interactive advertisement that is provided by a third party commercial content provider is loaded onto a particular interface, such as the email interface. The interactive advertisement invites the user to add a feed of rich media calendar events to the user's individual calendar. A user causes the feed to the user's individual calendar to be added by clicking on an area within the interactive advertisement. In response to the clicking, all rich media calendar events that belong to the feed are added to the user's individual calendar.

In one embodiment, when a user adds the rich media event feed, the rich media calendar events, or portions thereof, are copied from the central repository into the user's own set of data. In an alternative embodiment, references to each of the particular calendar events that are stored in the central repository are added to the user's own set of data. In either embodiment, the user's interfaces load the third party calendar events into the interfaces, and display the third party calendar events alongside the user's user-created calendar events.

Other interactive interfaces may be used to solicit users to add rich media calendar events to users' individual calendars. For example, an email message that contains a button for adding a particular event feed to a user's calendar can be sent to one or more users. Alternatively, the button can be included in a group message that is published on a particular group's common interface.

Rich media events, or event feeds, can be removed. According to one embodiment, a rich media event, or event feed, is removed from a user's calendar by a particular user. Alternatively, the third party content provider can remove the event, or event feed, from the entire calendar system through the rich media calendar API. When the events are added by individual users, the API maintains a record of the users to which a particular event has been distributed. When the API is requested to remove data, the API removes all the data associated with the calendar event, as well as all the data that was written to any user's own set of data when the event, or event feed, was added.

In a third alternative, each rich media event is associated with a delivery schedule that provides for when a particular rich media event will be automatically added, displayed, made active or inactive, or removed from a user's calendar. Using the third alternative, rich media events that are grouped as an event feed can be automatically added to, or removed from, a user's calendar at different pre-specified times.

Using Display Templates to Present Rich Media Calendar Events

When a particular interface of the different interconnected web-based interfaces in the calendar system is loaded, a portion of the user's set of data is loaded by the interface. The portion that is loaded depends on the particular purpose that is designated for the interface. For example, a user's web-based email interface loads the user's email data, as well as the user's calendar event data. Alternatively, a user's web-based calendar view interface loads only the user's calendar event data into a calendar view, such as a monthly calendar grid view.

According to one embodiment, the email interface that is rich-media-enabled recognizes that a particular calendar event includes a rich media extension portion. An email interface that is rich-media-enabled includes a rich media extension application that enables the email interface to parse the rich media extension portion of the calendar event. In one embodiment, the rich media extension application is a plug-in application that is added to a standard web-based email interface. An interface that is not rich-media-enabled would not recognize the rich media extension portion of the calendar event, and will only load the other portions of the calendar event.

Once an email interface has determined that a calendar event has a rich media extension portion, the email interface loads the rich media content using a display template that is provided with the calendar event. A display template specifies display characteristics for each of the calendar event data included in the calendar event. According to one embodiment of the invention, the display template is included in the data of the calendar event data record. In another embodiment, the data of the calendar event data record includes a reference to a display template, which is retrieved by the email interface when the calendar event data is loaded.

The display template, combined with the data included in the rich media extension portion of the calendar event, enables the rich media calendar event to be displayed in a particular interface. In one embodiment of the invention, in addition to code that defines the display characteristics of non-rich-media data in the rich media calendar event, a display template includes one or more rich media display applications, such as a video player, that parse the rich media data and render the rich media in a display.

Example: Rich Media Calendar Event in Email Interface

FIG. 2 is a block diagram that provides an example of how a rich media calendar event is displayed in an email interface. Referring to FIG. 2, central repository 200 stores display templates 202 and rich media content data 206. Calendar events 210 are the calendar events that belong to a particular user's own set of calendar events. Mail interface 220 is the email interface through which the particular user's set of calendar events and email data are loaded.

Within mail interface 220, a list of user's events 216 are displayed at the bottom of the webpage through which mail interface 220 is loaded and displayed. The list shows a portion of each of the calendar events that are displayed, for example, the date, the time, and an excerpt of the description of each of the events 216. In one embodiment, the list displays the soonest-occurring calendar events. In another embodiment, the list is automatically scrolling, and sequentially displays all the user's events.

Rich media calendar event 100, along with two other calendar events, uses template 204, and includes rich media data 208, which is a video, as shown in window 212. Window 212 also displays other details of event 100, including the date and time, a short description and detailed text, as well as photo gallery 218.

Display template 204, in addition to defining the location the data objects within window 212, also provides active code for rendering and presenting the rich media content. For example, display template 204 includes hypertext markup language (HTML,) Javascript, and cascading style sheet (CSS) code. The code of the display template is executed by mail interface 220 when the calendar event is loaded.

In FIG. 2, a user positions mouse pointer 214 over event 100. Mail interface 220, after determining that even 100 is a rich media event, loads window 212 using active code that is included in display template 204. The code included in display template 204 causes the other data from event 100 to be displayed as shown in FIG. 2, including causing the video to play within window 212, as well as causing the photo gallery application to load the photo gallery 218.

In one embodiment of the invention, mail interface 220 is implemented using Ajax techniques, which, through using a combination of at least HTML, Javascript, and CSS, allow a portion of mail interface 220 to be updated with data from a repository without requiring reloading mail interface 220. For example, when the mail interface 220 detects mouse pointer 214 positioned over calendar item 100, the associated rich media calendar event data is downloaded from the repository, code that is included in display template 204 is executed, and window 212 is rendered and displayed, without reloading mail interface 220.

Delivery Schedules

Delivery schedules can be used to control the delivery of specific content within a rich media calendar event. For example, a particular rich media calendar event is defined by the event's display template to present only one video. However, multiple videos may be included with the event, wherein each video has its own specified delivery schedule.

For example, referring to FIG. 3, rich media calendar event 300 includes three videos: video1, video2, and video3. Rich media calendar event 300 also includes a "delivery schedule" portion that indicates when each of the videos will be scheduled to appear. The display template "distmp1" enables only one of the videos to be displayed at a time. This feature enables a content provider to bundle and distribute all video updates with the rich media calendar event, so that the rich media can be modified without any additional input by the content provider. Only the videos that are determined to be active are displayed. The videos that are determined to be inactive are ignored by the display template.

Application-Specific Templates

Figure 4:
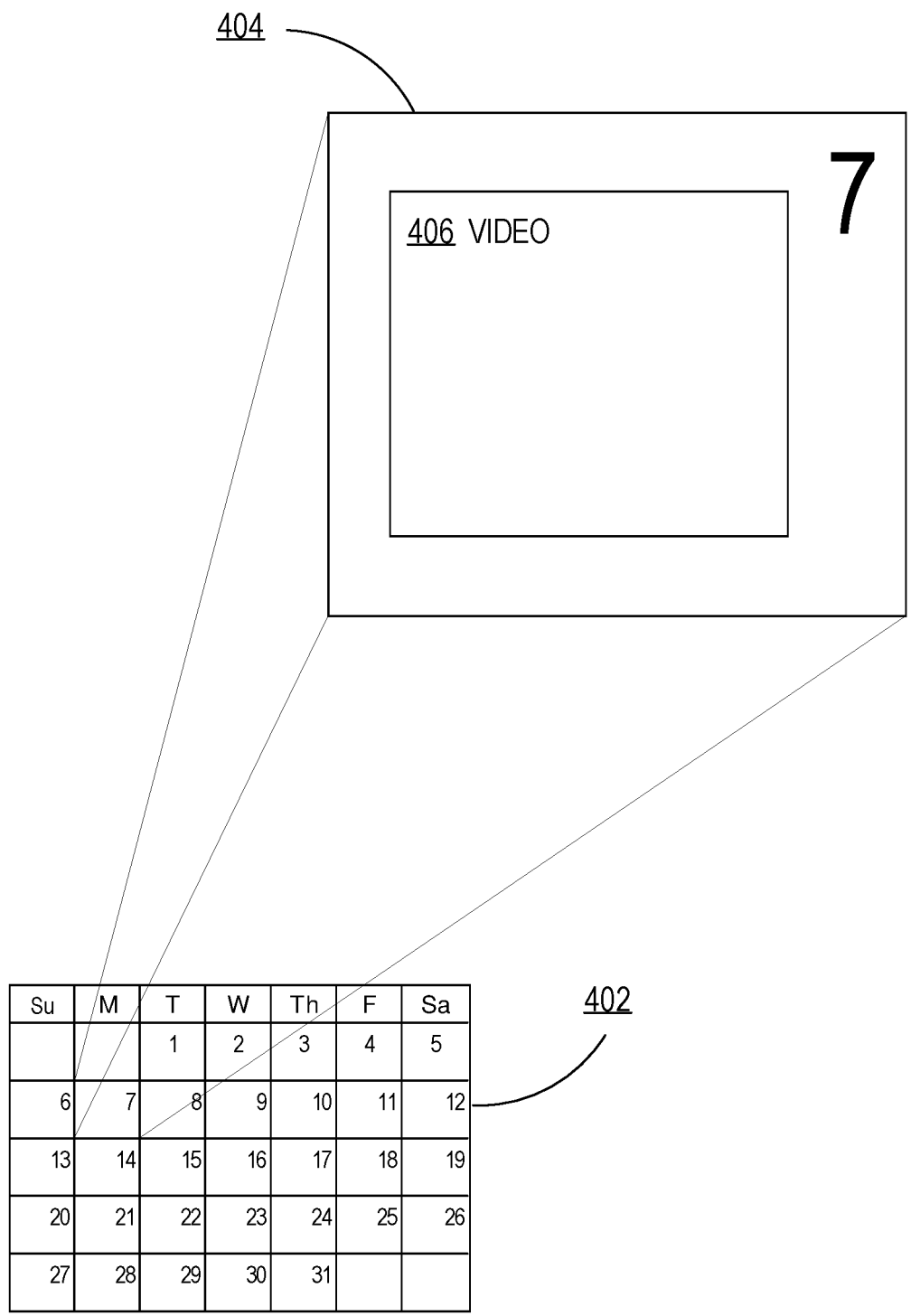
FIG. 4 is a block diagram that illustrates one example of how rich media is displayed in a calendar grid interface, according to one embodiment of the invention.

A single rich media calendar event may include multiple display templates. For example, the same rich media calendar event may include a template X for displaying an event in one interface, and a template Y for displaying the same event in another interface. FIG. 4 provides an example of how a monthly calendar grid view of a calendar interface uses a different display template to present a rich media calendar event. According to one embodiment of the invention, monthly view 402 in the calendar interface loads a preview of particular rich media objects from rich media calendar events that are loaded onto the interface. For example, cell 404, which displays events occurring on the 7th day of the month, displays video 406 in a video player window within cell 404. The code that is executed to render video 406 in this manner is included within the rich media calendar event's particular display template that is designated for use with monthly view 402.

According to one embodiment of the invention, a user is provided with a choice among several display templates for a particular event. For example, a commercial content provider has created four display templates for defining the display characteristics a particular rich media calendar event on an email interface. Each display template has a different physical layout or design, for example, a different window background, a different logo, or different display fonts.

User-Generated Rich Media Content and Events

According to one embodiment, the rich media API enables users to create rich media calendar events. In this embodiment, a user requests to create a rich media calendar event through the user's calendar interface. The calendar interface communicates with the rich media API to provide a user with a graphical rich media calendar event creation interface. The event creation interface loads and presents a form that has fields into which users may upload certain rich media objects into the calendar event. The form may be a display template in a WYSIWYG ("what you see is what you get") format. The event creation interface can present several versions of display templates that a user may select for creating a rich media calendar event.

The user can graphically manipulate the objects in the form. For example, the user can arrange where the date, time, description, or video fields are positioned in a display window. In this embodiment, the event is saved directly into the user's own set of data, instead of into the central repository. Alternatively, the event can be published into shared interface, for example, a group interface, that provides users who belong to the group a means to add the rich media calendar event into the user's individual calendar.

For example, a user creates an event for a group. An event is created by a user for the group that is a soccer-related event. The user is provided with various templates to select. The templates vary by design and by content. In one embodiment, a template includes default content, such as a description of a particular soccer facility at a park, and default images, or other rich media content, such as a short video showing the soccer facility. In addition, the display template allows a user to add customized data, including rich media data.

In another embodiment, the calendar interface enables a user to graphically add rich media content directly onto a calendar interface. The calendar interface provides the user with a set of graphical objects and drawing tools. A user is able to drag-and-drop graphics directly onto the calendar interface. For example, a user drags an image of a birthday cake onto a cell of a monthly calendar view. In one embodiment, the action of dragging the image onto the cell automatically causes the calendar interface to create a rich media calendar event for the date, wherein the rich media calendar event includes the single rich media content, as well as the additional information necessary to load the image as the user had positioned it. Alternatively, if the cell onto which the birthday cake is positioned is loaded with an existing calendar event, such as an event with descriptive text, "David's Birthday," the birthday cake can be added to the existing event.

In another embodiment, a user creates rich media objects using the set of drawing tools. For example, a user is able to draw a graphical circle around an event to highlight the event. In the embodiment, the action of drawing the circle creates either a rich media calendar event data record into which the newly-created image is added, or associates the newly-created image with an existing event that is in proximity to the newly-created image.

Electronic Mail Reminder System

According to one embodiment of the invention, each rich media calendar event includes a reminder schedule, which specifies when, and how, an email is delivered to the user's Inbox for reminding the user of an upcoming event. The reminder schedule for the event is maintained by the rich media calendar API, which sends a reminder email to all users who have added a particular rich media event, or event feed, to the users' individual calendars. In another embodiment, at the time a user adds the event, or event feed, the user can elect whether to receive reminder messages for the event.

In the embodiment, rich media email reminder templates, and rich media email reminder messages, are generated by the content provider and stored in the central repository. A rich media email reminder message, like rich media calendar events, include a rich media extension portion that can be rendered and displayed by executing the code included in a rich media email reminder display template.

According to one embodiment of the invention, email reminders are automatically generated in response to any updates to the content of any rich media calendar event that has been added to a users' individual calendar.

The Integrated Rich Media Calendar System

Figure 5:
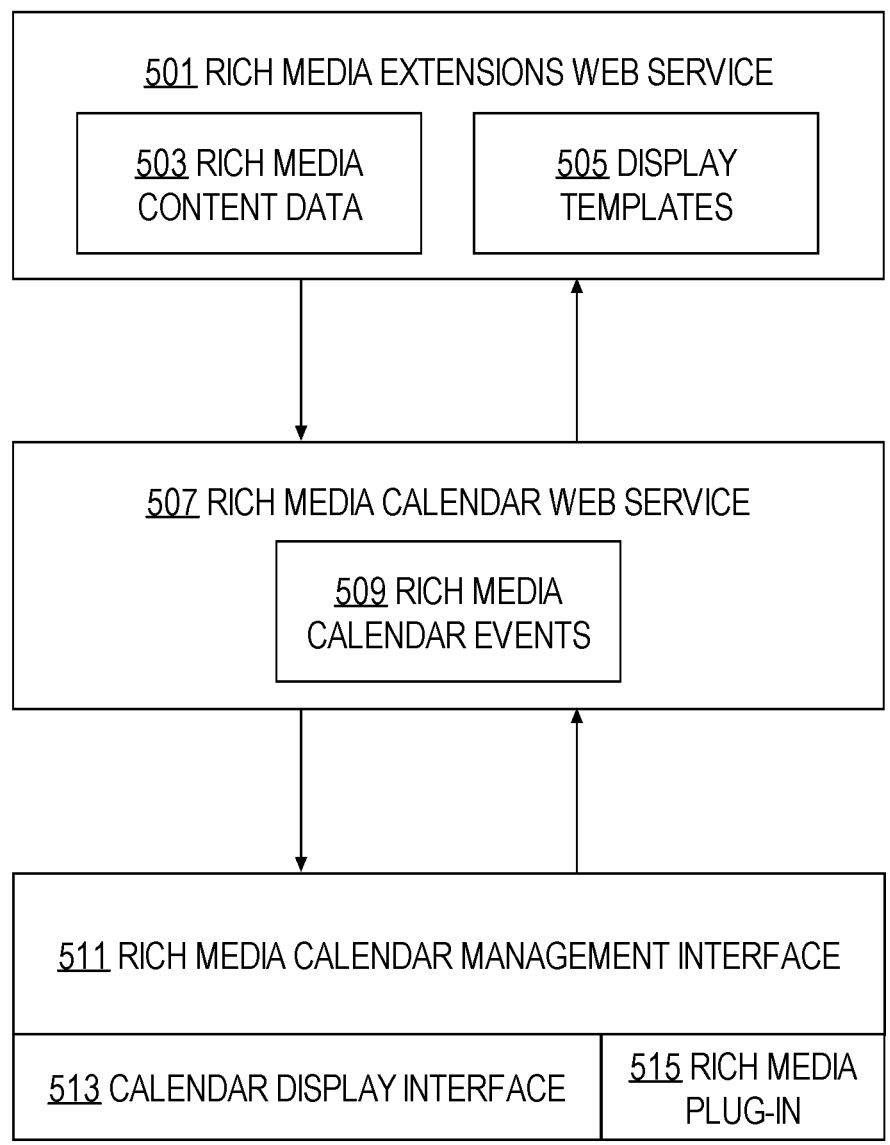
FIG. 5 is a block diagram that illustrates one example of the components that comprise an integrated rich media calendar system, according to one embodiment of the invention.

FIG. 5 illustrates the components of the integrated rich media calendar system according to one embodiment of the invention. Rich media extensions web service 501 includes an API that enables rich media content data and display templates to be maintained and retrieved. Rich media calendar web service 507 includes an API that enables calendar events to be created and maintained.

Access to, and communication with, rich media extensions web service 501 and the rich media calendar web service 507 is achieved through the rich media calendar interface 511 and the calendar display interface 513. Rich media calendar management interface 511 enables a user or a content provider to upload rich media content data to the central repository included in rich media extensions web service 501, to include the rich media content data into calendar events, and to create delivery schedules for rich media calendar events or rich media content. Calendar display interface 513 is an interface that displays calendar events to a user. The calendar display interface 513 can be embedded within other interface, such as an email interface. According to one embodiment of the invention, interfaces 511, 513 are sent through a network and loaded in a web browser for displaying to a user.

Rich media plug-in 515 is a plug-in application that allows calendar display interface 513, which is not rich-media-enabled, to parse and execute the rich media extension portion of a rich media event. Without rich media plug-in 515, calendar display interface 513 would not be able to present the rich media extension portion of the rich media event.

Hardware Overview

Figure 6:
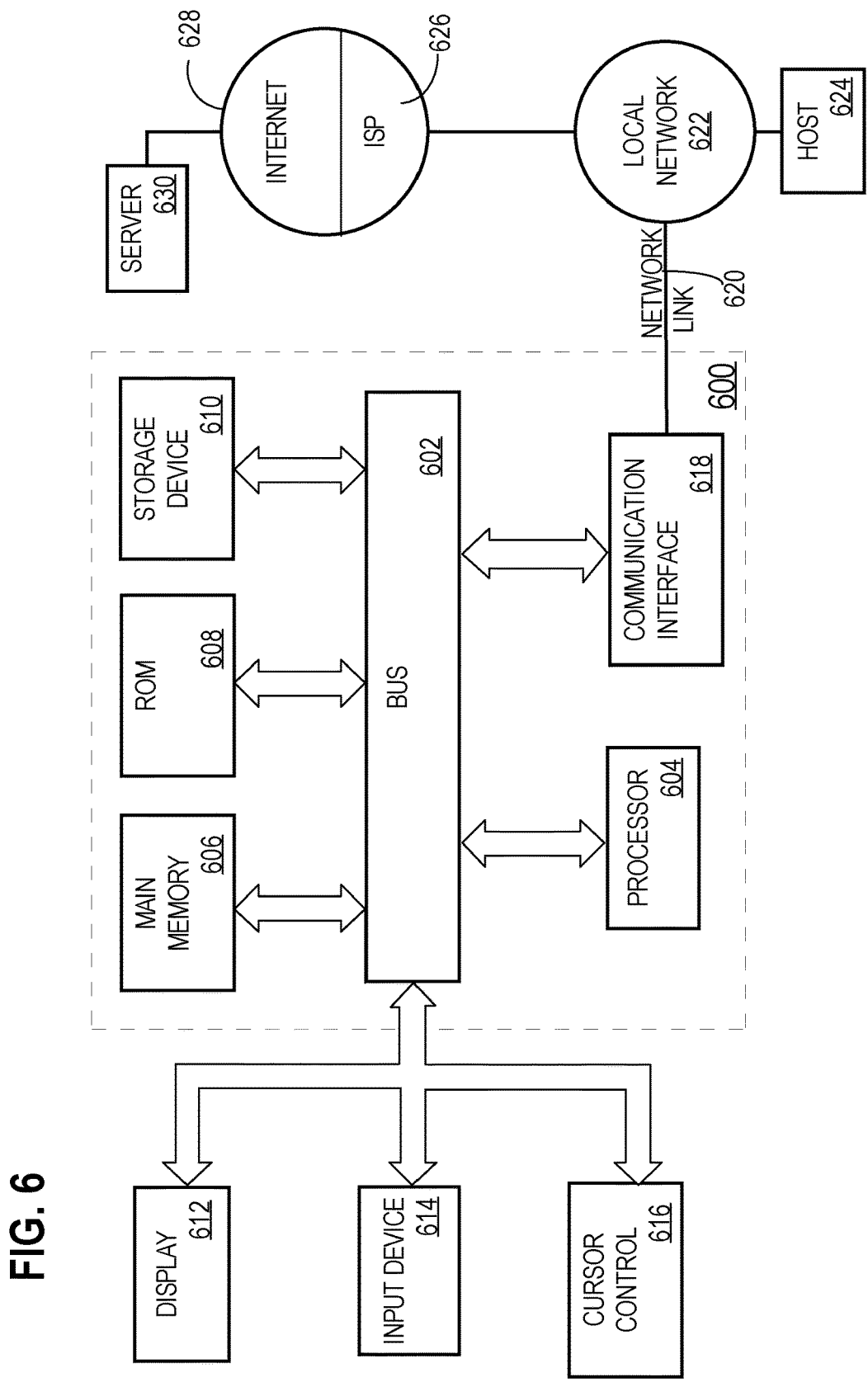
FIG. 6 is a block diagram that illustrates one example of a computer system on which one embodiment of the invention can be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610.

Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 600, various machine-readable media are involved, for example, in providing instructions to processor 604 for execution. Such a medium may take many forms, including but not limited to storage media and transmission media. Storage media includes both non-volatile media and volatile media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
    storing a calendar event in a calendar system, wherein the calendar event comprises:
        dynamic rich media content to be conditionally displayed with the calendar event, and
        data that specifies an active time interval for display of the dynamic rich media content;
    displaying a rich-media-enabled Web-based display interface;
    determining whether a current time is within the active time interval for the calendar event;
    in response to determining that the current time is within the active time interval for the calendar event, automatically causing display of the calendar event with the dynamic rich media content for the calendar event via the rich-media-enabled Web-based display interface, wherein the dynamic rich media content is presented according to (i) a first display template, when the interface is a first application's interface, and (ii) a second display template, when the interface is a second application's interface different from the first application's interface; and
    in response to determining that the current time is not within the active time interval for the calendar event, instead of causing display of the calendar event with the dynamic rich media content for the calendar event via the rich-media-enabled Web-based display interface, causing display of the calendar event without the dynamic rich media content for the calendar event via the rich-media-enabled Web-based display interface,
    wherein the method is performed by one or more computing devices.

2. The computer-implemented method as recited in claim 1, wherein the dynamic rich media content is one or more of: video content; audio content; dynamic graphical content; interactive graphical content; or an interactive application.

3. The computer-implemented method as recited in claim 1, further comprising:
    receiving a request to add a feed of calendar events to a particular set of user data;
    determining a set of calendar events that are included in the feed of calendar events; and
    automatically causing display of particular dynamic rich media content for the set of calendar events in the feed of calendar events based upon data that specifies one or more active time intervals for the set of calendar events.

4. The computer-implemented method as recited in claim 1, wherein:
    the calendar system maintains a list of users who have added a particular calendar event; and
    the computer-implemented method further comprises:
    receiving a request to remove the particular calendar event from the calendar system; and
    removing copies of the particular calendar event from one or more sets of user data that is associated with the users included in the list of users who have added the particular calendar event.

5. The computer-implemented method as recited in claim 1, wherein:
    the calendar system maintains a list of users who have added a particular calendar event; and
    the computer-implemented method further comprises:
    maintaining a reminder schedule for the particular calendar event; and
    sending a reminder message to each user included in the list of users who have added the particular calendar event, wherein the reminder message is presented to a user based in part on the delivery schedule.

6. The computer-implemented method as recited in claim 1, wherein the calendar event further comprises display template information comprising the first and second display templates;
    wherein the dynamic rich media content is displayed based on the first or second display template;
    wherein the display template information includes data that defines display characteristics of the dynamic rich media content.

7. The computer-implemented method as recited in claim 6, wherein the display template information includes one or more of a rich media display application or one or more of instructions in the form of HTML, Javascript, or CSS.

8. The computer-implemented method as recited in claim 6,
    wherein the rich-media-enabled Web-based display interface is embedded within a different interface, and
    wherein presenting the rich-media-enabled Web-based display interface comprising the calendar event does not require reloading the different interface.

9. The computer-implemented method as recited in claim 1, further comprising:

in response to a user's selection, causing display of more portions of the calendar event with the dynamic rich media content.

10. The computer-implemented method as recited in claim 1, wherein the dynamic rich media content comprises a plurality of different content items, each of the different content items having a different, active time interval that is specified by a provider of the content item.

11. The computer-implemented method as recited in claim 1, wherein the first application is electronic mail and the second application is a calendar.

12. One or more non-transitory computer-readable storage media comprising instructions which, when processed by one or more processors, cause:
storing a calendar event in a calendar system, wherein the calendar event comprises:
dynamic rich media content to be conditionally displayed with the calendar event, and
data that specifies an active time interval for display of the dynamic rich media content;
presenting a rich-media-enabled Web-based display interface;
determining whether a current time is within the active time interval for the calendar event;
in response to determining that the current time is within the active time interval for the calendar event, automatically causing display of the calendar event with the dynamic rich media content for the calendar event via the rich-media-enabled Web-based display interface, wherein the dynamic rich media content is presented according to
(i) a first display template, when the interface is a first application's interface, and
(ii) a second display template, when the interface is a second application's interface different from the first application's interface; and
in response to determining that the current time is not within the active time interval for the calendar event, instead of causing display of the calendar event with the dynamic rich media content for the calendar event via the rich-media-enabled Web-based display interface, causing display of the calendar event without the dynamic rich media content for the calendar event via the rich-media-enabled Web-based display interface.

13. The one or more non-transitory computer-readable storage media as recited in claim 12, wherein the dynamic rich media content is one or more of: video content; audio content; dynamic graphical content; interactive graphical content; or an interactive application.

14. The one or more non-transitory computer-readable storage media as recited in claim 12, further comprising additional instructions which, when processed by the one or more processors, cause:
receiving a request to add a feed of calendar events to a particular set of user data;
determining a set of calendar events that are included in the feed of calendar events;
and
automatically causing display of particular dynamic rich media content for the set of calendar events in the feed of calendar events based upon data that specifies one or more active time intervals for the set of calendar events.

15. The one or more non-transitory computer-readable storage media as recited in claim 12, wherein:
the calendar system maintains a list of users who have added a particular calendar event; and
the one or more non-transitory computer-readable media further comprise additional instructions which, when processed by the one or more processors, cause: receiving a request to remove the particular calendar event from the calendar system; and
removing copies of the particular calendar event from one or more sets of user data that is associated with the users included in the list of users who have added the particular calendar event.

16. The one or more non-transitory computer-readable storage media as recited in claim 12, wherein:
the calendar system maintains a list of users who have added a particular calendar event; and
the one or more non-transitory computer-readable media further comprise additional instructions which, when processed by the one or more processors, cause: maintaining a reminder schedule for the particular calendar event; and
sending a reminder message to each user included in the list of users who have added the particular calendar event, wherein the reminder message is presented to a user based in part on the delivery schedule.

17. The one or more non-transitory computer-readable storage media as recited in claim 12, wherein the calendar event further comprises display template information comprising the first and second display templates;
wherein the dynamic rich media content is displayed based on the first or second display template;
wherein the display template information includes data that defines display characteristics of the dynamic rich media content.

18. The one or more non-transitory computer-readable storage media as recited in claim 12, wherein the display template information includes at least one or more of instructions in the form of HTML, Javascript, or CSS.

19. The one or more non-transitory computer-readable storage media as recited in claim 12,
wherein the rich-media-enabled Web-based display interface is embedded within a different interface, and
wherein presenting the rich-media-enabled Web-based display interface comprising the calendar event does not require reloading the different interface.

20. An apparatus comprising: one or more processors, and one or more non-transitory computer-readable storage media comprising instructions which, when processed by the one or more processors cause:
storing a calendar event in a calendar system, wherein the calendar event comprises:
dynamic rich media content to be conditionally displayed with the calendar event, and
data that specifies an active time interval for display of the dynamic rich media content;
presenting a rich-media-enabled Web-based display interface;
determining whether a current time is within the active time interval for the calendar event;
in response to determining that the current time is within the active time interval for the calendar event, automatically causing display of the calendar event with the dynamic rich media content for the calendar event via the rich-media-enabled Web-based display interface, wherein the dynamic rich media content is presented according to (i) a first display template, when the interface is a first application's interface, and (ii) a second display template, when the interface is a second application's interface different from the first application's interface; and in response to determining that the current time is not within the active time interval for the calendar event, instead of causing display of the calendar event with the dynamic rich media content for the calendar event via the rich-media-enabled Web-based display interface, causing display of the calendar event without the dynamic rich media content for the calendar event via the rich-media-enabled Web-based display interface.

21. The apparatus as recited in claim 20, wherein:

the rich-media-enabled Web-based display interface is embedded within a different interface, and presenting the rich-media-enabled Web-based display interface comprising the calendar event does not require reloading the different interface.

* * * * *